US008842795B2

(12) United States Patent
Akatsuka et al.

(10) Patent No.: US 8,842,795 B2
(45) Date of Patent: Sep. 23, 2014

(54) METHOD OF HANDLING CONTROL ROD AND CONTROL ROD HANDLING APPARATUS

(75) Inventors: Hirokazu Akatsuka, Hitachi (JP); Toshihiro Kodama, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 761 days.

(21) Appl. No.: 12/872,155

(22) Filed: Aug. 31, 2010

(65) Prior Publication Data

US 2011/0064180 A1    Mar. 17, 2011

(30) Foreign Application Priority Data

Sep. 16, 2009   (JP) ................................. 2009-213872

(51) Int. Cl.
| | | |
|---|---|---|
| *G21C 7/06* | (2006.01) | |
| *G21C 19/105* | (2006.01) | |
| *G21C 7/113* | (2006.01) | |

(52) U.S. Cl.
CPC .............. *G21C 19/105* (2013.01); *G21C 7/113* (2013.01)
USPC ........................................................ 376/220

(58) Field of Classification Search
CPC .............................. G21C 7/113; G21C 19/105
USPC ........................................................ 376/220
See application file for complete search history.

(56) References Cited

U.S. PATENT DOCUMENTS

| | | | | |
|---|---|---|---|---|
| 3,720,580 A | * | 3/1973 | Schabert et al. | ............... 376/223 |
| 3,762,994 A | * | 10/1973 | Kunzel | ........................... 376/234 |
| 5,331,675 A | | 7/1994 | Hosoya et al. | |
| 5,570,399 A | | 10/1996 | Sakamaki | |

FOREIGN PATENT DOCUMENTS

| | | |
|---|---|---|
| JP | 06-082594 | 3/1994 |
| JP | 7-110394 | 4/1995 |
| JP | 2000-155188 A  * | 6/2000 |

* cited by examiner

*Primary Examiner* — Frank J McGue
(74) *Attorney, Agent, or Firm* — Antonelli, Terry, Stout & Kraus, LLP.

(57) ABSTRACT

A control rod grasped by a hook of a grasping equipment is moved down and is positioned at an upper end of a hollow piston of a control rod drive mechanism (CRD) in a state that the control rod is fully withdrawn from a core. Furthermore, the hook is inserted into an opening of a handle of the control rod. The hook is lifted up so as to make contact with the handle. The control rod grasped by the grasping equipment is rotated by a grasping equipment rotation apparatus. A state that gaps formed between joint convexities in a coupling socket of the control rod are positioned right above coupling spud convexities of the hollow piston occurs. At this time, the control rod falls by its own weight and the coupling spud convexities pass through the gaps. A grasping equipment movement apparatus suppresses the falling speed of the control rod. The control rod is rotated at 90° and the control rod and CRD are connected. The time required for connecting the control rod and the hollow piston of the control rod drive mechanism can be shortened even further.

2 Claims, 10 Drawing Sheets

METHOD OF HANDLING CONTROL ROD AND CONTROL ROD HANDLING APPARATUS

CLAIM OF PRIORITY

The present application claims priority from Japanese Patent application serial no. 2009-213872, filed on Sep. 16, 2009, the content of which is hereby incorporated by reference into this application.

BACKGROUND OF THE INVENTION

1. Technical Field

The present invention relates to a method of handling a control rod and a control rod handling apparatus and more particularly to a method of handling a control rod and a control rod handling apparatus which are suited to apply to a boiling water reactor (hereinafter, referred to as BWR).

2. Background Art

To connect a control rod and a control rod drive mechanism (hereinafter, referred to as CRD) that are used in the BWR, a bayonet coupling is used. The control rod connected to the CRD by the bayonet coupling, when the neutron absorption capacity is reduced, is removed from the CRD and is taken out from a reactor pressure vessel. A new control rod is connected to the CRD in place of the taken-out control rod. Such an exchange operation of the control rod, for example, is explained in Japanese Patent 3119728.

The bayonet coupling for the control rod and CRD is described in Japanese Patent 3119728. The bayonet coupling is composed of a coupling socket installed at a lower end portion of the control rod and a coupling spud installed on an upper end portion of the CRD. In the neighborhood of the leading edge of the coupling spud, coupling spud convexities are arranged at intervals of 90° in a peripheral direction and on an inner surface of a hole portion of the coupling socket into which the coupling spud is inserted, joint convexities are arranged at intervals of 90° in the peripheral direction. And, the coupling spud convexities and joint convexities are joined to each other, thus the control rod and CRD are connected to each other. If the coupling socket is rotated at 45° in the peripheral direction, the joint of the coupling spud convexities and joint convexities is released, thus the connection of the control rod and CRD is released.

When attaching the control rod to the CRD, in the state that the control rod is grasped by a control rod grasping equipment installed in the control rod handling apparatus which is hung with a wire rope at the leading edge of a connection member of a supplementary hoist of a fuel exchange apparatus, the wire rope is moved down, thus the control rod handling apparatus and control rod are moved down. If the control rod handling apparatus and control rod are moved down, the coupling socket and the coupling spud do not coincide with each other in phase of the spud convexities and the socket concavities, so that the coupling socket of the control rod makes contact with a upper end face of the coupling spud of the CRD and the descent of the control rod handling apparatus and control rod is stopped. When the control rod handling apparatus and control rod are rotated at 45° in the state that the descent is stopped, the coupling socket and the coupling spud coincide with each other in the phase of the spud convexities and the socket concavities. When the coupling socket and the coupling spud coincide with each other in the phase of the spud convexities and the socket concavities, the control rod handling apparatus and control rod are moved down again. After the coupling spud is inserted completely into the coupling socket, the control rod handling apparatus and control rod are rotated again at 45°, thus the connection of the control rod and CRD is completed.

When removing the control rod from the CRD, firstly, the control rod handling apparatus which is hung with a wire rope at the leading edge of the connection member of the supplementary hoist of the fuel exchange apparatus is moved down, and a handle at the upper end portion of the control rod is grasped by the control rod grasping equipment of the control rod handling apparatus, and thereafter, the control rod is lifted up. Furthermore, the hollow piston of the CRD connected to the control rod by the bayonet coupling is lifted up by operating the CRD. The control rod grasped by the control rod grasping equipment is rotated at 45°, thus the coupling socket installed at the lower end portion of the control rod is rotated relative to the coupling spud of the hollow piston. When the coupling spud and the coupling socket coincide with each other in phase of the spud convexities and the socket concavities, the coupling spud is removed from the coupling socket and only the control rod grasped by the control rod grasping equipment enters the pulled-up state. After the coupling spud is rotated at 45°, the control rod is pulled up and the removal operation of the control rod from the CRD is finished.

PRIOR ART LITERATURE

Patent Literature

Patent literature 1: Japanese Patent 3119728

SUMMARY OF THE INVENTION

Technical Problem

As described above, when connecting the control rod to the hollow piston of the CRD, the control rod handling apparatus and control rod are rotated at 45°, and the coupling socket of the control rod and the coupling spud of the hollow piston are permitted to coincide with each other in the phase, and the control rod handling apparatus and control rod are moved down. At this time, in the state that the control rod handling apparatus and control rod are rotated at 45°, a state that the coupling socket of the control rod and the coupling spud of the hollow piston do not coincide with each other in the phase may occur. When the control rod handling apparatus and control rod are moved down in the state that the coupling socket and coupling spud do not coincide with each other in the phase, a state that the coupling spud is not inserted into the coupling socket and the coupling socket is placed on the upper end face of the coupling spud or a state that the coupling spud is caught halfway in the coupling socket may occur. Therefore, the coupling socket of the control rod and the coupling spud of the hollow piston cannot be connected to each other, so that the control rod cannot be attached to the CRD.

Further, to permit the coupling socket and the coupling spud of the hollow piston to coincide with each other in the phase, it is necessary to repeat the rotation of the control rod and the movement of the control rod in the vertical direction. Therefore, the time required for the exchange operation of the control rod is prolonged and there are possibilities that processes of a periodic inspection of the BWR may be influenced.

An object of the present invention is to provide a method of handling a control rod and a control rod handling apparatus capable of shortening the time required for connecting the control rod and a control rod drive mechanism.

Solution to Problem

A feature of the present invention for accomplishing the above object is that a control rod held by a control rod grasping apparatus is moved down in a reactor pressure vessel together with the control rod grasping apparatus, and a coupling socket installed at the lower end portion of the control rod is positioned at an upper end portion of a hollow piston existing in the reactor pressure vessel and is installed in the control rod drive mechanism installed in the reactor pressure vessel;

thereafter, the control rod is rotated;

when gaps formed between adjacent second projections formed on an inner surface of a hole portion in a peripheral direction of the hole portion formed in a coupling socket by rotation of the control rod, are positioned right above first projections projected toward an outside and installed on each upper end portion of a plurality of coupling spuds that are included in the hollow piston and arranged around the upper end portion of the hollow piston, the control rod is moved down by its own weight and first projections are permitted to pass through the gaps; and in the state that the first projections are positioned above the second projections, the control rod is rotated and the first projections are positioned right above the second projections.

In the state that the coupling socket is positioned at the upper end portion of the hollow piston, the control rod is rotated, so that when the gaps formed between the adjacent second projections are positioned right above the first projections, the control rod is moved down by its own weight and the first projections are inserted into each gap. Therefore, the first projections can be inserted into the hole portion formed in the coupling socket and the time required for connecting the control rod and the hollow piston of the control rod drive mechanism can be shortened even further.

Another feature of the present invention is that a control rod grasping apparatus is moved down in a reactor pressure vessel;

in a state that first projections projected toward an outside, in a hole portion formed in a coupling socket installed at a lower end portion of a control rod, at each upper end portion of a plurality of coupling spuds included in a hollow piston of a control rod drive mechanism installed in the reactor pressure vessel, exist right above second projections formed on an inner surface of the hole portion, the control rod grasping apparatus is joined to a handle existing at an upper end portion of the control rod connected to the hollow piston;

the control rod grasping apparatus is permitted to rise upward and the control rod joined to the control rod grasping apparatus and hollow piston are lifted up, thereafter, the control rod is rotated, and when the gaps formed between the adjacent second projections in the peripheral direction of the hole portion are positioned right below the first projections by the rotation of the control rod, the hollow piston is moved down by its own weight and the first projection is permitted to pass through the gaps, and the control rod grasping apparatus is moved more upward, and the control rod is moved up so as to permit the lower end portion of the coupling socket to position above the upper end of the first projections.

Since the control rod and hollow piston are lifted up by the control rod grasping apparatus, when the gaps formed between the adjacent second projections in the peripheral direction of the hole portion formed in the coupling socket are positioned right below the first projections by the rotation of the control rod, the hollow piston is moved down by its own weight and the first projections can pass through the gaps. Therefore, the first projections of the coupling spud can be removed easily from the coupling socket by use of its own weight of the hollow piston. Consequently, the connection of the control rod and the control rod drive mechanism can be released easily.

Advantageous Effect of the Invention

According to the present invention, due to the descent of the control rod by its own weight, the first projections can be inserted into the hole portion formed in the coupling socket and the time required for connecting the control rod and control rod drive mechanism can be shortened even further.

DETAILED DESCRIPTION OF THE PREFERRED EMBODIMENTS

Figure 1:
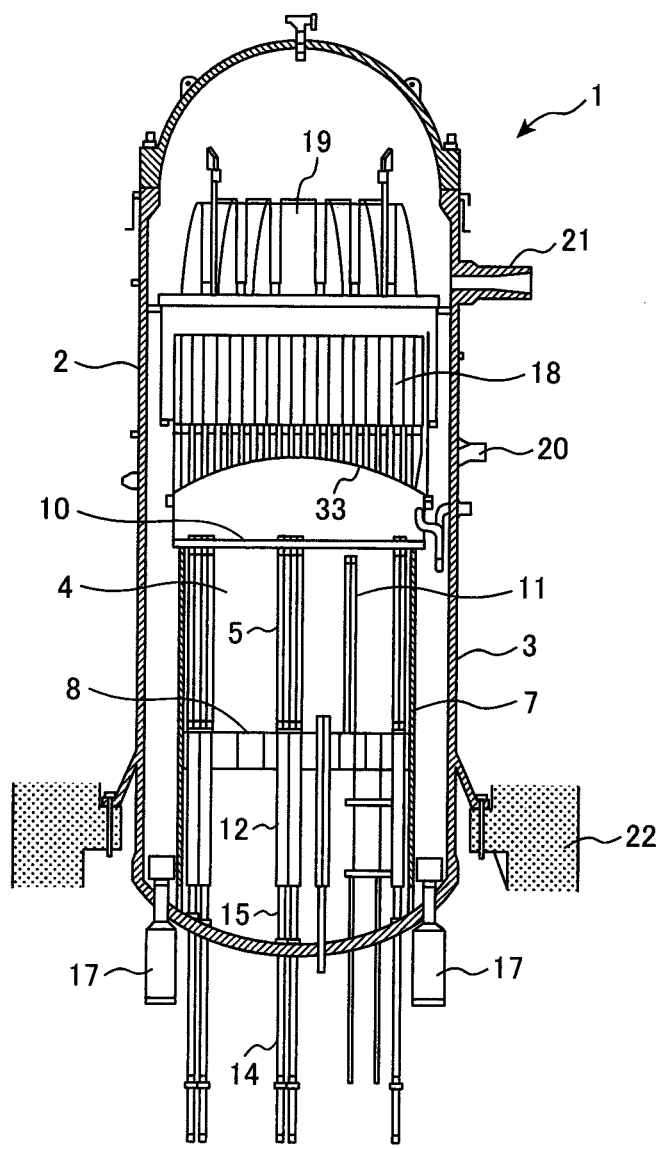
FIG. 1 is a longitudinal sectional view showing a nuclear reactor of the boiling water nuclear plant.
Figure 2:
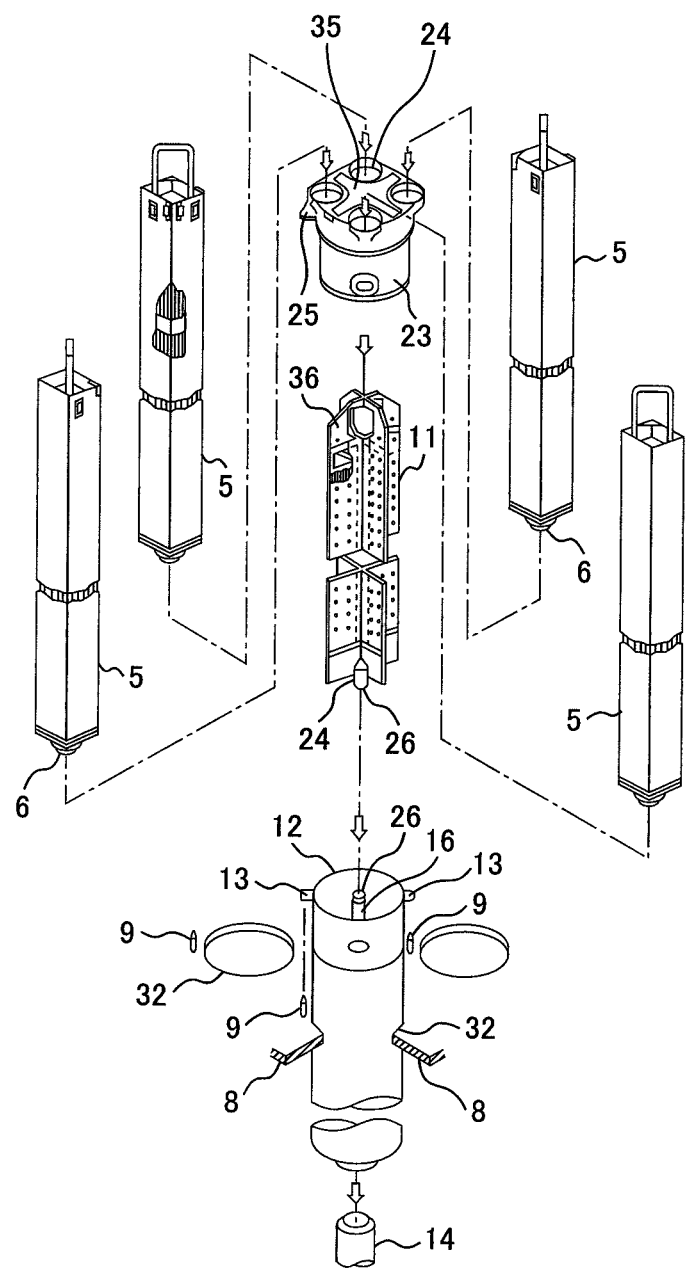
FIG. 2 is an assembly drawing showing fuel assemblies, a control rod, and a fuel support shown in FIG. 1.
Figure 3:
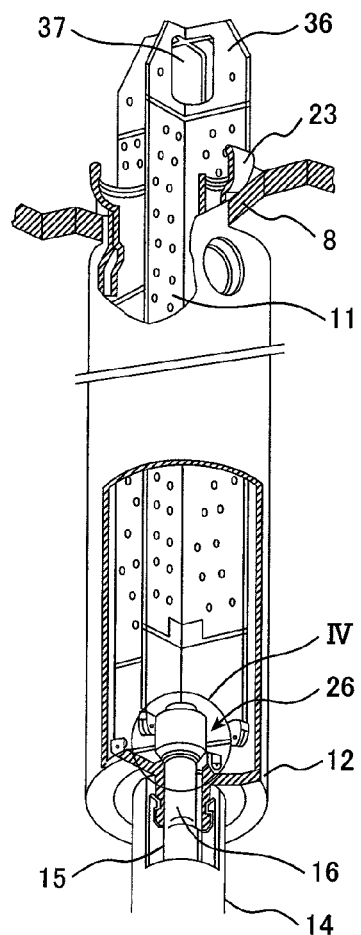
FIG. 3 is a perspective view showing a connection portion of a control rod and a control rod drive mechanism shown in FIG. 2.

The embodiments of the present invention are explained below.

Embodiment 1

Before explaining a method of handling a control rod that is a preferable one embodiment of the present invention, firstly, a boiling water nuclear plant (BWR plant) 1 to which the method of handling the control rod of the present embodiment is applied is explained by referring to FIGS. 1 to 5.

The BWR plant 1 is provided with a nuclear reactor 2 and a turbine (not drawn). The nuclear reactor 2 has a reactor pressure vessel 3, a core 4, a core shroud 7, a core support plate 8, an upper grid plate 10, a plurality of control rods 11, a plurality of control rod drive mechanism housings (hereinafter, referred to as CRD housing) 14, a plurality of control rod drive mechanisms (hereinafter, referred to as CRD) 15, a plurality of internal pumps 17, a separator 18, and a dryer 19. The core shroud 7, core support plate 8, upper grid plate 10, control rod 11, separator 18, and dryer 19 are disposed in the reactor pressure vessel 3.

The core 4 in which a plurality of fuel assemblies 5 are loaded is disposed in the reactor pressure vessel 3. The core shroud 7 installed in the reactor pressure vessel 3 surrounds the core 4. A plurality of CRD housings 14 pass through the bottom of the reactor pressure vessel 3 and are installed in the reactor pressure vessel 3. The core support plate 8 is disposed in the core shroud 7 and is installed in the core shroud 7. A plurality of control rod guide tubes 12 are inserted into a plurality of hole portions 32 formed in the core support plate 8. Each of the control rod guide tubes 12 is mounted to the core support plate 8 by joining joint portions 13 installed at an upper end of the control rod guide tube 12 to pins 9 installed in the core support plate 8 (refer to FIG. 2). A plurality of fuel supports 23 are attached removably to the respective control rod guide tubes 12. Four fuel assemblies 5 are supported by one fuel support 23. A joint portion 25 installed in the fuel support 23 is disposed on the joint portion 13 and joined to the above pin 9 to prevent rotation (refer to FIG. 2).

Four cooling water paths having an opening 24 are formed in the fuel support 23. Each of the fuel assemblies 5 is supported by the fuel support 23 when a lower tie-plate 6 is inserted into one opening 24 of one cooling water path. An upper end of each of the fuel assemblies 5 is held by the upper grid plate 10 that is disposed in the core shroud 7 and attached to the core shroud 7.

The separator 18 arranged above the upper grid plate 10 is installed on a shroud head 33 attached to the core shroud 7. The dryer 19 is arranged above the separator 18 and is installed in the reactor pressure vessel 3. The reactor pressure vessel 3 is disposed in a reactor primary containment vessel (not drawn) installed in a reactor building (not drawn) and is installed on a pedestal 22 installed in the reactor primary containment vessel.

The control rod 11 is disposed in each of the control rod guide tubes 12 and the CRD 15 is installed in each of the CRD housings 14. The control rod 11 is connected to the hollow piston 16 of the CRD 15 by a bayonet coupling 26 (refer to FIG. 3). At the upper end of the control rod 11, a handle 36 is installed. When the nuclear reactor 2 is shut down, the control rods 11 is inserted completely in the core 4, concretely, among the adjacent fuel assemblies 5 through a control rod through-hole 35 formed in the fuel support 23 from the control rod guide tube 12 by the operation of the CRD 15 (refer to FIG. 2). When the nuclear reactor 2 is in operation, a part of the control rods 11 is inserted in the core 4 and adjusts reactor power. The residual control rods 11 are withdrawn completely from the core 4 and exist in the control rod guide tubes 12.

Figure 4:
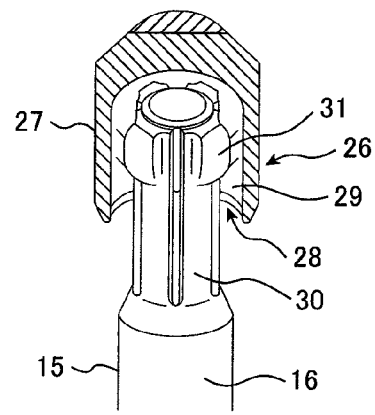
FIG. 4 is an enlarged diagram showing IV portion shown in FIG. 3.

The constitution of the bayonet coupling 26 is explained below by referring to FIGS. 4 and 5. The bayonet coupling 26 includes a coupling socket 27 and a plurality of coupling spuds 30. The coupling socket 27 is installed at a position of an axial center of the control rod 11 at the lower end portion of the control rod 11 and the plurality of coupling spuds 30 are installed at the upper end portion of the hollow piston 16. These coupling spuds 30 are arranged around the upper end portion of the hollow piston 16. In the coupling socket 27, a hole portion 28 opened toward the lower end into which an upper end portion of the hollow piston 16 and the coupling spuds 30 are inserted is formed. A plurality of joint convexities (second projection portion) 29 are formed on the inner surface of the hole portion 28 and are arranged at intervals of 90° in the peripheral direction of the hole portion 28. A gap 38 through which the coupling spuds 30 can pass is formed between the joint convexities 29 adjoining each other in the peripheral direction of the hole portion 28. The coupling spuds 30 are arranged at intervals of 90° in the peripheral direction of the hollow piston 16. A gap through which the joint convexities 29 can pass is formed between the coupling spuds 30 adjoining each other in a peripheral direction of the hollow piston 16. Coupling spud convexities (first projection portion) 31 are formed at the upper end portion of each of the coupling spuds 30. The coupling spud convexities 31 are projected outside an outer side surface of the coupling spuds 30 in the radial direction of the hollow piston 16.

Figure 5:
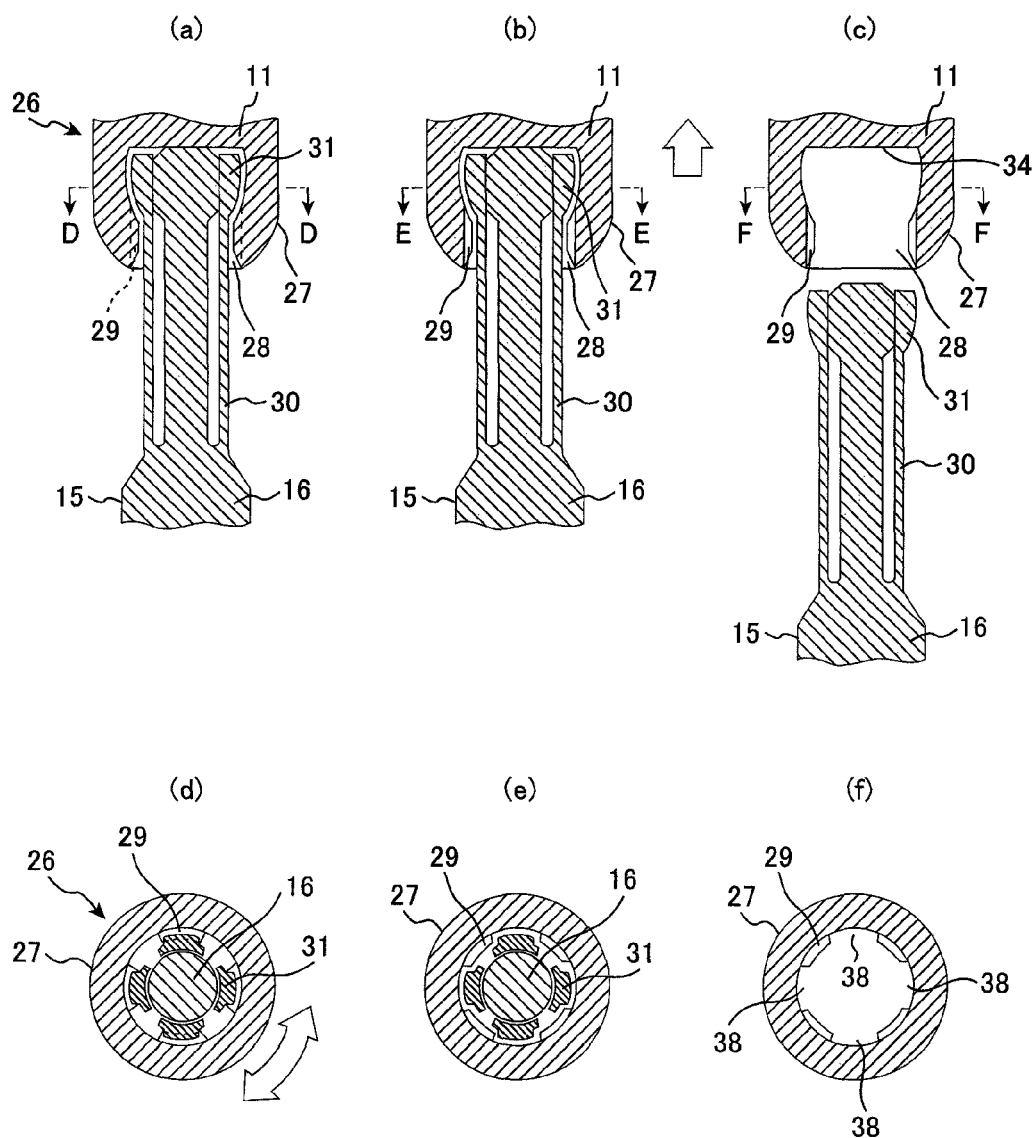
FIG. 5 is an explanatory drawing showing a release procedure of a bayonet coupling shown in FIG. 4, and (a), (b) and (c) are longitudinal sectional views showing the bayonet coupling at the three stages of the procedure, and (d) is a sectional view taken along a line D-D shown in (a), and (e) is a sectional view taken along a line E-E shown in (b), and (f) is a sectional view taken along a line F-F shown in (c).

The control rod 11 and CRD 15 are connected to each other using the bayonet coupling 26 (refer to (a) and (d) shown in FIG. 5). In the state that the control rod 11 and CRD 15 are connected, each of the coupling spuds 30 is inserted into the coupling socket 27 and each of the coupling convexities 31 is positioned right above the joint convexities 29 in an axial direction of the CRD 15. Therefore, the coupling convexities 31 are caught in the joint convexities 29, so that the withdrawal operation of the control rod 11 from the core 4 by the CRD 15 can be performed. When the control rod 11 is inserted into the core 4, the upper end of the hollow piston 16 makes contact with a bottom 34 (refer to (c) shown in FIG. 5) of the hole portion 28 formed in the coupling socket 27, that is, the coupling socket 27. Therefore, the control rod 11 can be inserted into the core 4 by the operation of the CRD 15.

The control rod 11 has a cruciform cross section and four blades. The control rod 11 exists in the control rod through-hole 35 having a cruciform cross section which is formed at an axial center of the fuel support 23, so that the control rod 11 cannot rotate around the axial center in the state that it is installed in the reactor pressure vessel 3. Therefore, the control rod 11 and CRD 14 that are connected by the bayonet coupling 26 are not disconnected from each other in the ordinary use state in the reactor pressure vessel 3.

Figure 6:
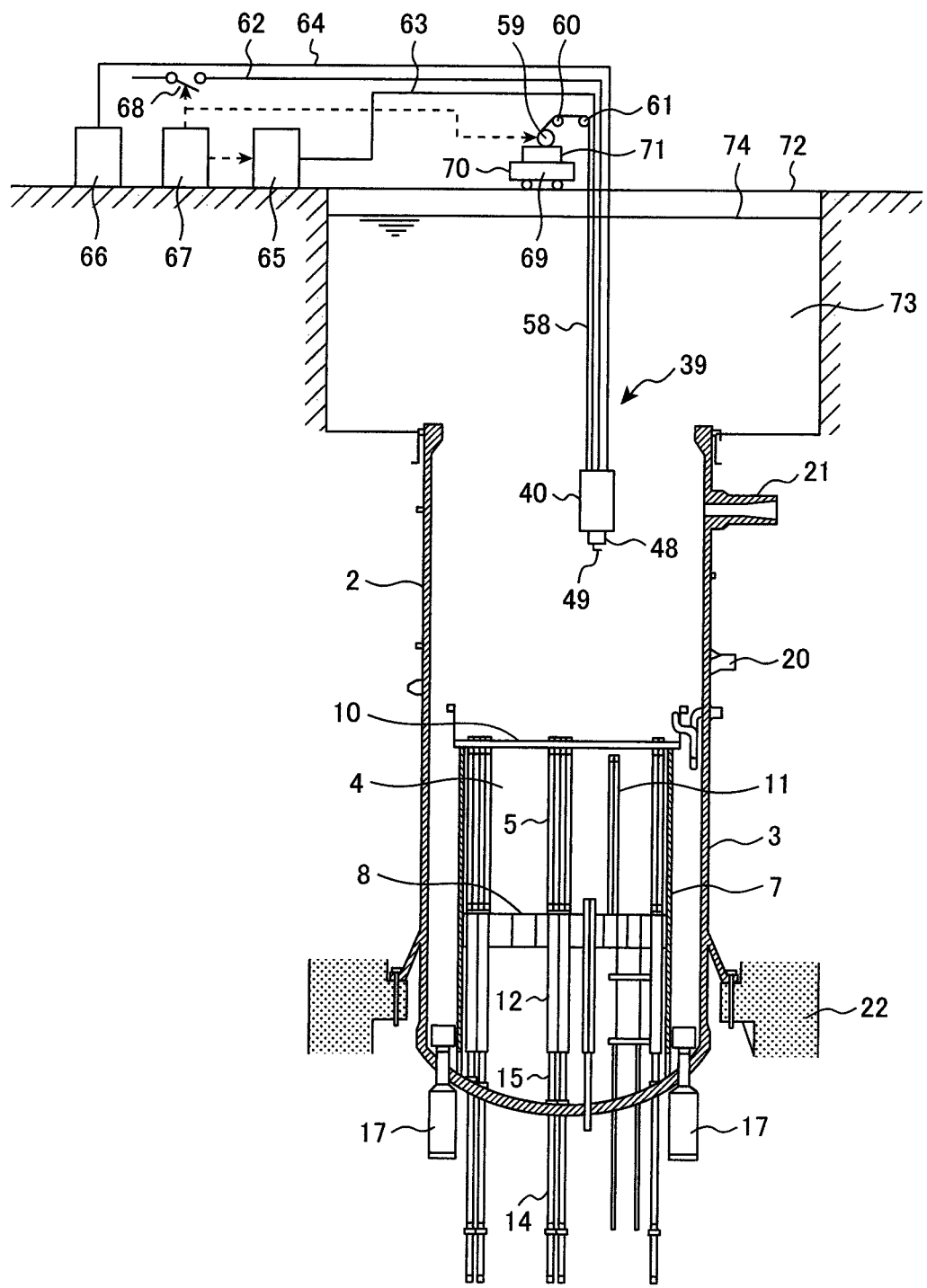
FIG. 6 is a structural diagram showing a control rod handling apparatus used in a method of handling a control rod of Embodiment 1 that is a preferable one embodiment of the present invention.

A control rod handling apparatus 39 used in the method of handling the control rod of the present embodiment is explained below by referring to FIGS. 6 and 7.

The control rod handling apparatus 39 is provided with a handling apparatus body 40, a display apparatus 66, and a control apparatus 67. The handling apparatus body 40 has a casing 41, a grid guide 42, a grasping equipment rotation apparatus 43, a grasping equipment movement apparatus (movement apparatus, shock relief apparatus) 52, and a grasping equipment (control rod grasping apparatus) 48. The grid guide 42 is installed at an upper end of the casing 41. The grasping equipment rotation apparatus 43 and grasping equipment movement apparatus 52 are installed in the casing 41.

The grasping equipment rotation apparatus 43 has a motor 44 and a rotary shaft 46. The motor 44 is installed on an inner surface of the casing 41 by a support member 47. The rotary shaft 46 passes through a rotary shaft 45 in the axial direction of the rotary shaft 46 of the motor 44. An axial center of the rotary shaft 46 coincides with an axial center of the rotary shaft 45. The rotary shaft 46 is joined to a key (not shown)

installed on the rotary shaft 45 and can slide in the axial direction of the rotary shaft 45 along the rotary shaft 45.

The grasping equipment movement apparatus 52 has cylinder apparatuses 53A and 53B, an operation plate 57, and limit switches 55A, 55B, 56A, and 56B. The cylinder apparatuses 53A and 53B are installed on the inner surface of the casing 41 at the opposite positions at 180°. The circular operation plate 57 is connected to a piston rod 54A of the cylinder apparatus 53A and a piston rod 54B of the cylinder apparatus 53B. Although not drawn, the piston rod 54A is connected to a piston disposed in the cylinder of the cylinder apparatus 53A and the piston rod 54B is connected to a piston disclosed in the cylinder of the cylinder apparatus 53B. The operation plate 57 is arranged under the motor 44 and the cylinder apparatuses 53A and 53B are arranged under the operation plate 57.

The limit switches 55A, 55B, 56A, and 56B are attached to the inner surface of the casing 41. The limit switches 55A and 56A are installed in correspondence to the cylinder apparatus 53A and the limit switch 55A is placed under the limit switch 56A. The limit switches 55B and 56B are installed in correspondence to the cylinder apparatus 53B and the limit switch 55B is placed under the limit switch 56B. The distance between the limit switch 55A and the limit switch 56A in the axial direction of the casing 41 is the same as the distance between the limit switch 55B and the limit switch 56B.

The operation plate 57 is disposed between the limit switch 55A and the limit switch 56A and between the limit switch 55B and the limit switch 56B. The limit switches 55A, 55B, 56A, and 56B set the movement range of the operation plate 57 in the axial direction of the casing 41. The limit switches (first position detection apparatus) 55A and 55B set a lower limit of the movement range of the operation plate 57 and the limit switches (second position detection apparatus) 56A and 56B set an upper limit of the movement range of the operation plate 57. Namely, the operation plate 57 can move between the limit switches 55A and 55B and the limit switches 56A and 56B in the axial direction of the casing 41. In other words, the limit switches 55A and 55B are a lower limit position detector of the operation plate 57 and the limit switches 56A and 56B are an upper limit position detector of the operation plate 57. The limit switches 55A, 55B, 56A, and 56B are connected to the display apparatus 66 with a cable 64.

The grasping equipment 48 is disposed under the operation plate 57 and passes through the bottom plate of the casing 41. A support rod 50 is attached to an upper end of the grasping equipment 48 and a support plate 51 is attached to an upper end of the support rod 50. The upper end portion of the support rod 50 is inserted into a through hole formed at the central part of the operation plate 57 and the support plate 51 is held on a top surface of the operation plate 57. Therefore, the grasping equipment 48 is supported by the cylinder apparatuses 53A and 53B. The support plate 51 is attached to the lower end of the rotary shaft 46. A hook 49 is attached rotatably to a lower end portion of the grasping equipment 48.

The method of handling the control rod of the present embodiment using the control rod handling apparatus 39 is explained below by referring to FIGS. 6, 7, 8, and 9.

After the BWR plant 1 is stopped in operation due to the periodic inspection, an upper cover of the reactor pressure vessel 3 is removed, and the upper cover is conveyed to a predetermined location in the nuclear reactor building by a ceiling crane (not shown) installed in the nuclear reactor building. Before removing the upper cover, a reactor well 73 formed right above the reactor pressure vessel 3 is filled with cooling water 74 (refer to FIG. 6). The dryer 19, separator 18, and shroud head 33 which are installed in the reactor pressure vessel 3 are removed and are transferred from the reactor pressure vessel 3 by the ceiling crane.

Thereafter, the exchange operation of the control rods 11 is executed. When the BWR plant 1 is not in operation all the control rods 11 are inserted fully into the core 4 by each of the CRDs 15.

During a period of the periodic inspection, the control rods 11 in the reactor pressure vessel 3 are exchanged.

A fuel exchange apparatus 69 is disposed on a guide rail (not shown) installed on an operation floor 72 in the reactor building (refer to FIG. 6) and moved along the guide rail. The fuel exchange apparatus 69 has a travelling carriage 70 travelling on the guide rail and a traversing carriage 71 that is installed on the travelling carriage 70 and travels on the travelling carriage 70. A supplementary hoist 59 used for the control rod exchange operation is installed on the traversing carriage 71 of the fuel exchange apparatus 69 used for the fuel exchange operation. Rollers 60 and 61 are attached to a support member (not drawn) installed on the traversing carriage 71.

Figure 7:
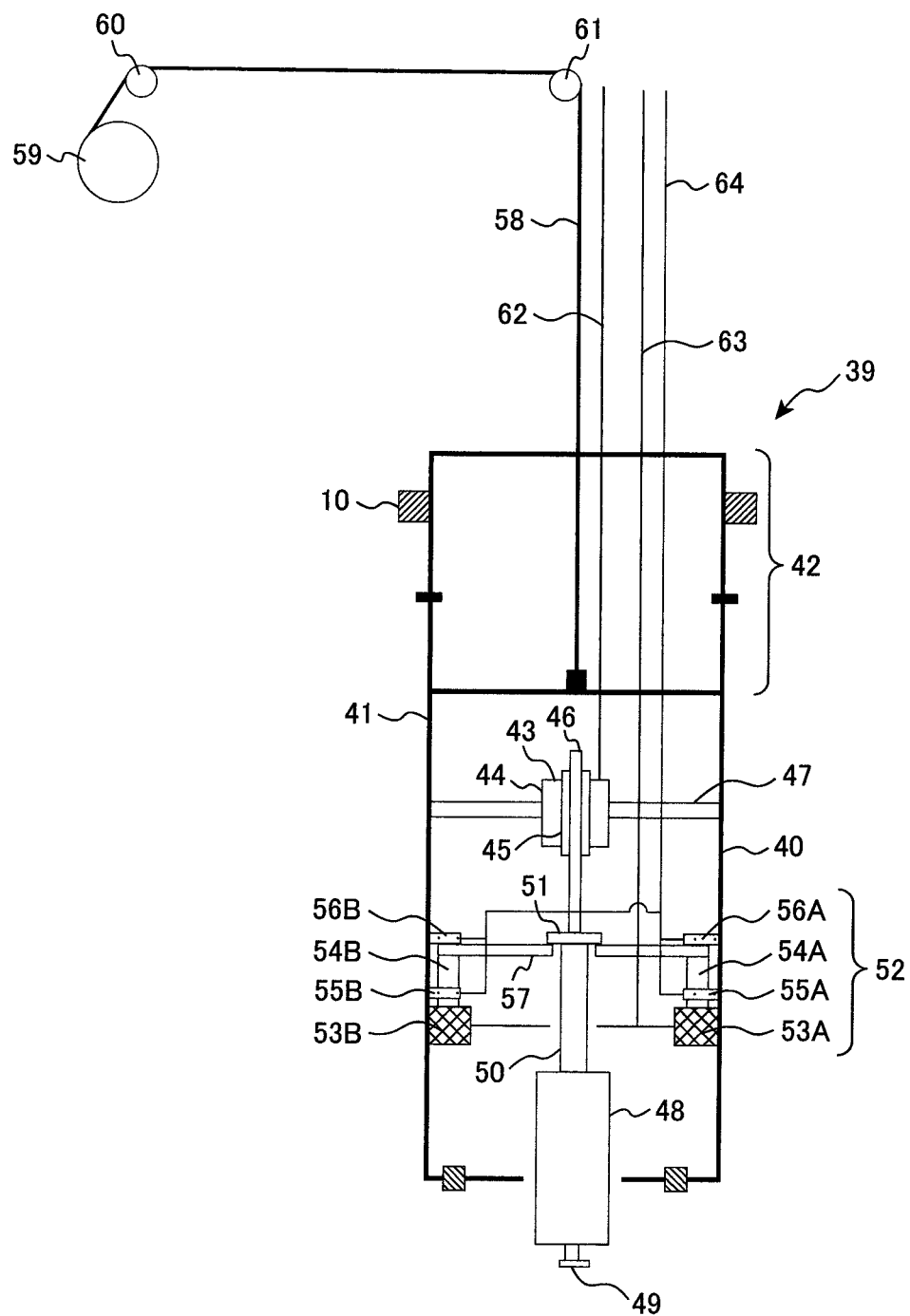
FIG. 7 is a detail structural diagram showing a handling apparatus body shown in FIG. 6.

Even in the method of handling the control rod of the present embodiment, when the control rods 11 are exchanged, each operation of Steps 101 to 112 shown in FIG. 7 of Japanese Patent 3119728 (U.S. Pat. No. 5,331,675) is performed. The four fuel assemblies 5 adjacent to the control rod being exchange object (the control rod that the neutron absorption capacity is lowered and the life has expired) which is fully inserted into the core 4 are taken out sequentially from the core 4 by the fuel exchange apparatus 69 and are transferred to the fuel storage pool in the reactor building. These fuel assemblies are supported by one fuel support 23. When transferring the fuel assemblies 5, a blade guide is used. After the transfer of the four fuel assemblies 5 is finished, the control rod 11 being the exchange object is fully withdrawn from the core 4 by the operation of the CRD 15. And, the blade guide is removed and is transferred outside the reactor pressure vessel 3.

Thereafter, the control rod exchange operation is performed. The exchange operation includes a step of releasing the connection of the control rod 11 to be exchanged which exists in the reactor pressure vessel 3 and the CRD 15 (refer to FIG. 8), a step of transferring the control rod 11 to be exchanged that the connection with the CRD 15 is released, from the reactor pressure vessel 3, a step of transferring a new control rod 11 into the reactor pressure vessel 3, and a step of connecting the new control rod 11 transferred into the reactor pressure vessel 3 to the CRD 15 (refer to FIG. 9). The release of the connection of the control rod 11 to be exchanged to the CRD 15, the transfer of the control rod 11 to be exchanged which is separated from the CRD 15 from the reactor pressure vessel 3, the transfer of the new control rod 11 into the reactor pressure vessel 3, and the connection of the new control rod 11 to the CRD 15 are executed using the control rod handling apparatus 39.

Figure 8:
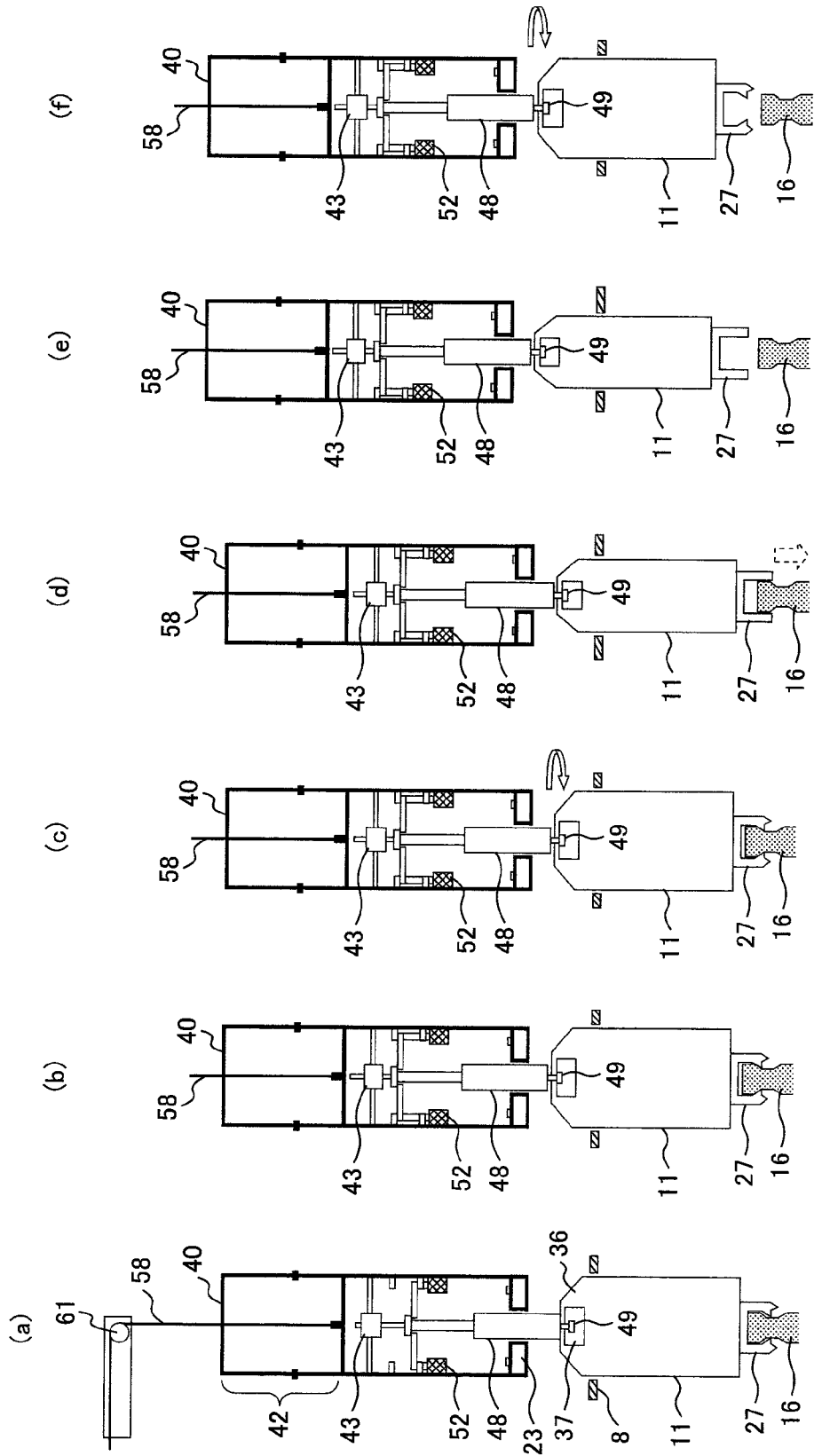
FIG. 8 is an explanatory drawing showing processes for releasing connection between a control rod and a control rod drive mechanism in a method of handling a control rod of embodiment 1.

The step of releasing the connection of the control rod 11 to be exchanged and the CRD 15 is explained by referring to FIG. 8.

A compressor 65, the display apparatus 66, and the control apparatus 67 are put on the operation floor 72. The display apparatus 66 and control apparatus 67 may be installed on an operation panel (not shown) placed on the operation floor 72. An air hose 63 connected to the compressor 65 is connected to each cylinder of the cylinder apparatuses 53A and 53B installed on the handling apparatus body 40.

A wire rope 58 wound around the supplementary hoist 59 is connected to the casing 41 of the handling apparatus body 40. The wire rope 58 is suspended over the rollers 59 and 60.

The handling apparatus body 40 connected to the wire rope 58 is moved down into the cooling water 74 in the reactor well 73. An operator presses the rewind button installed on the operation panel. By the button operation, the control apparatus 67 outputs a rewind control signal to the supplementary hoist 59. The supplementary hoist 59 is driven by the rewind control signal, rewinds the wire rope 58, and moves down the handling apparatus body 40 hung by the wire rope 58 to a certain height in the cooling water 74 in the reactor well 73. When the handling apparatus body 40 moves down to a certain height, the operator presses the hoist stop button installed on the operation panel. By the button operation, the control apparatus 67 outputs a hoist stop control signal and stops the drive of the supplementary hoist 59. The height of the handling apparatus body 40 in the cooling water 74 is detected by an encoder installed on the supplementary hoist 59 and is displayed on the display apparatus 66. In the state that the descent of the handling apparatus body 40 is stopped, the travelling carriage 70 and traversing carriage 71 are moved and the hook 49 of the handling apparatus body 40 hung by the wire rope 58 is positioned so as to position right above the control rod 11 to be exchanged.

After positioning, the rewind button is pressed, thus the control apparatus 67 outputs the rewind control signal and again drives the supplementary hoist 59. By doing this, the handling apparatus body 40 is moved down. The handling apparatus body 40 is moved down more through one cell of the upper grid plate 10 into which the respective upper ends of the four fuel assemblies taken out are inserted. When the handling apparatus body 40 moves down between the fuel assemblies 5 existing in the core 4 under the upper grid plate 10 and the hook 49 reaches in the neighborhood of the position of the handle 36 of the control rod 11, the operator presses the hoist stop button, thus the control apparatus 67 outputs the hoist stop control signal. The supplementary hoist 59 is stopped based on the hoist stop control signal and the descent of the handling apparatus body 40 is stopped. At this time, the grid guide 42 is caught in the upper grid plate 10 and the handling apparatus body 40 is positioned in the rotational direction of the rotary shaft 46.

Figure 11:
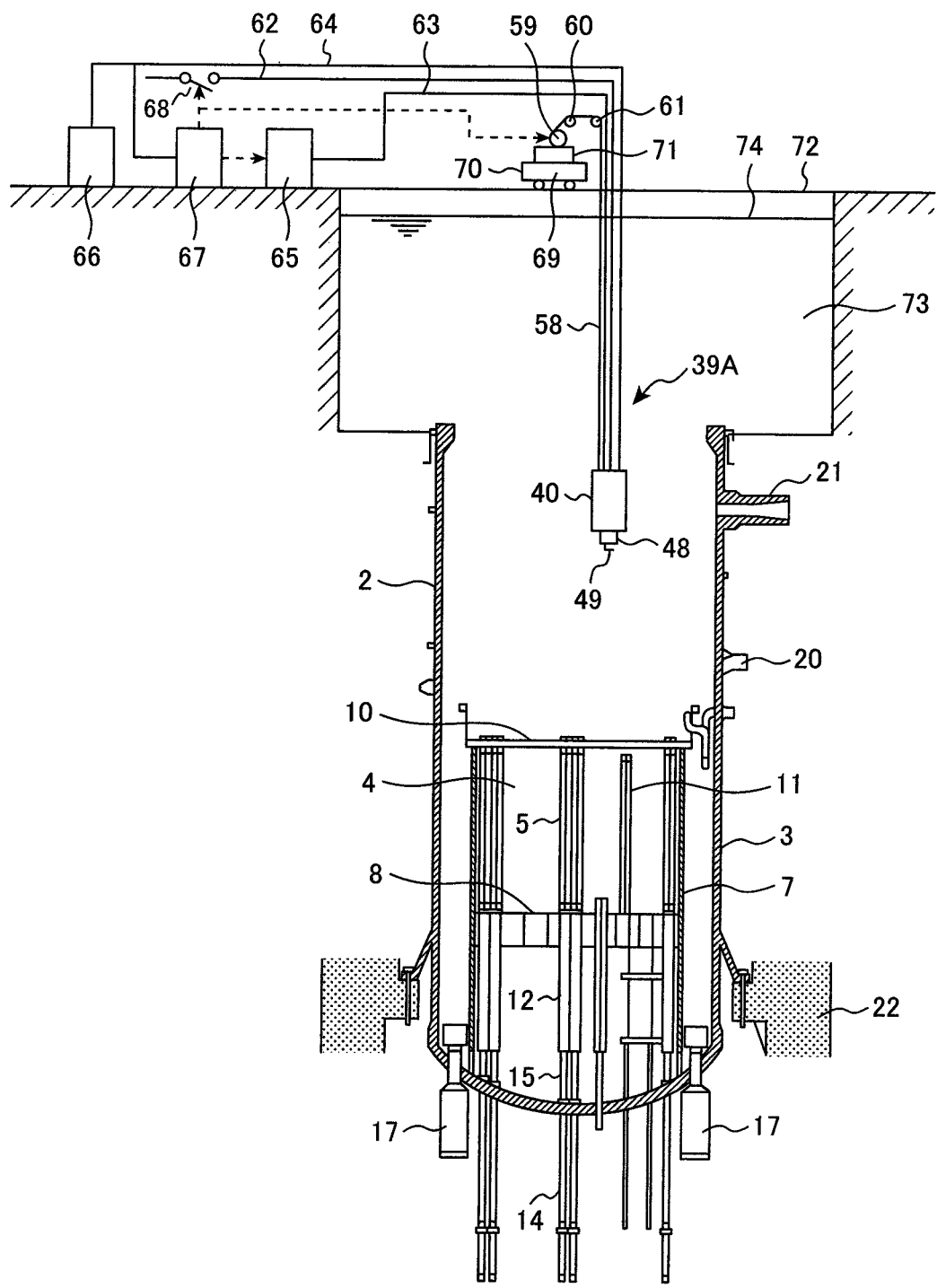
FIG. 11 is a structural diagram showing a control rod handling apparatus used in a method of handling a control rod of Embodiment 2 that is a another embodiment of the present invention.

Although not shown in FIG. 7, as described in FIG. 11 of Japanese Patent 3119728, the handling apparatus body 40 installs a fuel support handling portion having a fuel support grasping equipment in the casing 41. The fuel support handling portion moves vertically in the casing 41, so that it is structured and arranged so as not to interfere with the grasping equipment rotation apparatus 43, support member 47, grasping equipment 48, and grasping equipment movement apparatus 52.

After the descent of the handling apparatus body 40 is stopped, the operator presses the fuel support handling operation button installed on the operation panel. By the button operation, a control signal is output from the control apparatus 67 to the fuel support handling portion and as described in the paragraph 0046 and FIG. 16 of Japanese Patent 3119728, the fuel support 23 is grasped by the fuel support grasping equipment, and the fuel support handling portion is moved upward, thus the fuel support 23 is lifted up from the upper grid plate 8. The lifted fuel support 23 with the top positioned in the neighborhood of the lower end of the casing 41 is held by the fuel support grasping equipment (refer to (a) shown in FIG. 8). At this time, a part of the grasping equipment 48 exists in the control rod through-hole 35 of the fuel support 23.

The operator presses a hook close button installed on the operation panel. By the button operation, from the control apparatus 67, a hook close control signal is output to a hook drive apparatus (not shown) installed on the grasping equipment 48 through a cable (not shown). The hook drive apparatus operates to rotate the hook 49 and the hook 49 is inserted into an opening 37 formed in the handle 36 (refer to (a) shown in FIG. 8). At this time, the operation plate 57 is in contact with the limit switches 55A and 55B and the operation plate 57 is in the stop state.

The operator presses a compressor drive button installed on the operation panel. By this button operation, the control apparatus 67 outputs a drive control signal to the compressor 65. The compressor 65 is driven and the compressed air is supplied into the respective cylinders of the cylinder apparatuses 53A and 53B through the air hose 63 from the compressor 65. The compressed air acts so as to push up the piston in each cylinder and the piston rods 54A and 54B are pushed upward. At this time, the rotary shaft 46 moves upward in the rotary shaft 45. The operation plate 57 rises in correspondence with a rise of the piston rods 54A and 54B until it makes contact with the limit switches 56A and 56B. The support plate 51 is lifted up by the rise of the operation plate 57 and the grasping equipment 48 and hook 49 rise simultaneously. When the operation plate 57 makes contact with the limit switches 56A and 56B, operation signals are output from the limit switches 56A and 56B. The operation signals are transferred by the cable 64 and are displayed on the display apparatus 66. The operator, when viewing the operation signals of the limit switches 56A and 56B displayed on the display apparatus 66, presses a compressor stop button installed on the operation panel. By this button operation, the controller 67 outputs a stop control signal and stops the compressor 65. By doing this, the rise of the operation plate 57 is stopped and the rise of the hook 49 of the grasping equipment 48 is also stopped.

By the rise of the hook 49, the control rod 11 and the hollow piston 16 of the CRD 15 are lifted up. Each of the coupling spuds 30 installed on the hollow piston 16 is connected to the coupling socket 27 of the control rod 11 (refer to (a) and (b) shown in FIG. 5), so that by the rise of the hook 49, the hollow piston 16 is lifted up (refer to (b) shown in FIG. 8). When the hollow piston 16 of the CRD 15 is lifted up exceedingly, even if the hollow piston 16 is permitted to move down by its own weight, by the latch function for holding the hollow piston 16 to prevent the hollow piston 16 from falling, the hollow piston 16 will not fall down to its original position shown in (a) in FIG. 8. To prevent the hollow piston 16 from not falling down to its original position, the limit switches 56A and 56B for setting the upper limit position of the operation plate 57 are installed in the casing 41.

When the hollow piston 16 is in the state shown in (b) in FIG. 8 that it is lifted up at a predetermined distance, the operator presses a motor drive button installed on the operation panel. The state that the hollow piston 16 is positioned as shown in (b) in FIG. 8 is the state that the operation plate 57 makes contact with the limit switches 56A and 56B and operates these switches. The operation signals of the limit switches 56A and 56B are displayed on the display apparatus 66, so that the operator looks at the display apparatus 66, and thereby can know that the state shown in (b) in FIG. 8 appeared. The control apparatus 67 outputs a switch off control signal to a switch 68 connected to a cable 62 by the operation of the motor drive button and turns off the switch 68. By doing this, the motor 44 of the grasping equipment rotation apparatus 43 is rotated. In this state, the hollow piston 16 is connected to the coupling socket 27. The turning force of the motor 44 is transferred from the rotary shaft 45 to the rotary shaft 46, thus the rotary shaft 46 rotates, so that the grasping equipment 48, hook 49, and control rod 11 rotate (refer to (c) shown in FIG. 8). The fuel support 23 is lifted up and is held by the handling apparatus body 40 (refer to (a) shown in FIG. 8), so that it is positioned above the upper end of the control rod 11. Therefore, since the control rod 11 is not restricted by the fuel support 23, the control rod 11 is rotated in the control rod guide tube 12. The hollow piston 16 is installed in the CRD 15 to prevent it from rotating around the central axis.

The grasping equipment 48 and control rod 11 are rotated by the rotation of the motor 44. During rotation of the control rod 11, when the coupling spud convexity 31 formed at the upper end portion of each of the coupling spuds 30 is positioned right above the gap 38 formed between the joint convexities 29 in the coupling socket 27 (refer to shown in (b) and (e) in FIG. 5), the hollow piston 16 falls down to its original state, that is, the position shown in (a) in FIG. 8 by its own weight (refer to (d) shown in FIG. 8) in the state that the motor 44 is rotated. When the hollow piston 16 falls, each of the coupling spud convexities 31 passes through each of the gaps 38.

The fact that the hollow piston 16 falls and the control rod 11 is separated from the CRD 15 can be detected by a load gauge (not shown) installed on the grasping equipment 48. When the hollow piston 16 is connected to the control rod 11, the load gauge measures the total load of the control rod 11 and the hollow piston 16. When the hollow piston 16 falls and is separated from the control rod 11, the load gauge measures only the load of the control rod 11. The load measured in the latter case is reduced by the load of the hollow piston 16. The load measured by the load gauge is displayed on the display apparatus 66, so that the operator looks at the display apparatus 66, and thereby can know the separation of the hollow piston 16. The load measured by the load gauge is transferred to the control apparatus 67. When the load measured by the load gauge is changed (reduced), the control apparatus 67 stops the rotation of the motor 44. By doing this, the rotation of the control rod 11 is stopped.

After the control rod 11 and hollow piston 16 are separated, the operator presses a wind button installed on the operation panel. The control apparatus 67 outputs a wind control signal to the supplementary hoist 59 by the button operation. The supplementary hoist 59 is driven by the wind control signal and winds the wire rope 58. By doing this, the handling apparatus body 40 holding the fuel support 23 is pulled up together with the control rod 11 and the lower end of the coupling socket 27 of the control rod 11 reaches above the upper end of the hollow piston 16 of the CRD 15 (refer to (c) and (f) shown in FIG. 5). By doing this, the connection of the control rod 11 to the CRD 15 is released (refer to (e) shown in FIG. 8). When the lower end of the coupling socket 27 reaches above the upper end of the hollow piston 16 by a predetermined height, the operator presses a hoist stop button. By the supplementary hoist 59, the winding of the wire rope 58 is stopped and the rise of the handling apparatus body 40 is stopped.

When the operator presses the motor drive button, the control apparatus 67 turns off the switch 68, and the motor 44 is driven, and the control rod 11 grasped by the grasping equipment 48 and hook 49 rotates. The control apparatus 67 inputting an output signal of a limit switch (not shown) installed on the motor 44 turns on the switch 68 when deciding that the grasping equipment 48 rotates at 90° from the state shown in (a) in FIG. 8. The motor 44 is stopped and the rotation of the control rod 11 is stopped. At this time, the grasping equipment 48 and control rod 11 permit the hook 49 to rotate at 90° from the state that it is inserted into the opening 37 of the handle 36 (the state shown in (a) in FIG. 8) (refer to (f) shown in FIG. 8).

By the aforementioned processes, the connection release of the control rod 11 and CRD 15 is finished.

Thereafter, a process of carrying out the control rod 11 being the exchange object from the reactor pressure vessel 3 is executed. The operator presses the wind button. The wire rope 58 is wound around the supplementary hoist 59 and the handling apparatus body 40 rises in the core 4 and soon reaches the inside of the reactor well 73 from the inside of the reactor pressure vessel 3. When the control rod 11 to be exchanged is taken out from the reactor pressure vessel 3 and rises up to a predetermined height in the reactor well 73, the hoist stop button is operated by the operator and the winding of the wire rope 58 by the supplementary hoist 59 is stopped. The fuel exchange apparatus 69 is driven and the control rod 11 joined to the hook 49 is transferred to a predetermined position in the fuel storage pool. Thereafter, the control rod 11 is removed from the hook 49 and is kept in the fuel storage pool.

A process of transferring the new control rod 11 into the reactor pressure vessel 3 is explained below. In the fuel storage pool, the new control rod 11 is hung by the hook 49 of the grasping equipment 48. The handling apparatus body 40 holding the fuel support 23 and the new control rod 11 are transferred up to the reactor well 73 by driving of the fuel exchange apparatus 69. Furthermore, the new control rod 11 is positioned by the fuel exchange apparatus 69 so as to position right above the CRD 15 released from the connection with the control rod 11 to be exchanged. After the positioning of the above new control rod 11, the operator presses the rewind button and the drive control of the fuel exchange apparatus 69 is executed by the control apparatus 67. The supplementary hoist 59 is driven and the wire rope 58 is rewound from the supplementary hoist 59 and the handling apparatus body 40 and new control rod 11 move down in the reactor well 73. Soon, the new control rod 11 is transferred into the reactor pressure vessel 3.

A process of connecting the new control rod 11 to the CRD 15 using the bayonet coupling 26 is explained below by referring to FIG. 9.

The handling apparatus body 40 and new control rod 11 pass through one cell of the upper grid plate 10 and at the position where the control rod 11 taken out due to expiration of the life exists, move down between the fuel assemblies 5. The hollow piston 16 of the CRD 15 with the new control rod 11 connected thereto is in the fully withdrawn state. The lower end of the coupling socket 27 of the new control rod 11 is positioned at the upper end portion of the hollow piston 16 (refer to (a) shown in FIG. 9). At this time, the operation plate 57 is positioned at the upper limit position and makes contact with the limit switches 56A and 56B. The operation plate 57 is in the stop state. The fuel support 23 is held in the neighborhood of the lower end face of the casing 41 of the handling apparatus body 40 (refer to (a) shown in FIG. 9).

When the lower end portion of the coupling socket 27 is positioned at the upper end portion of the hollow piston 16, the load of the new control rod 11 is supported by the hollow piston 16. Therefore, the load of the new control rod 11 is not suspended over the hook 49, so that the load measured by the load gauge installed in the grasping equipment 48 is reduced by the load of the new control rod 11. The measured load is displayed on the display apparatus 66, so that the operator operates the hoist stop button when the load is reduced. By doing this, the supplementary hoist 59 is stopped.

The positioning of the lower end portion of the coupling socket 27 at the upper end portion of the hollow piston 16 is detected also by a limit switch (not shown) (hereinafter, referred to as a hook limit switch) installed on the lower end face of the grasping equipment 48. When the handle 36 of the new control rod 11 is in contact with the lower end face of the grasping equipment 48, the hook limit switch makes contact with the lower end face of the grasping equipment 48, enters the operation state, and outputs an operation signal. The operation signal is displayed on the display apparatus 66. When the operation signal of the hook limit switch is displayed on the display apparatus 66, the operator judges that the new control rod 11 is in the state that it is in contact with the lower end face of the grasping equipment 48. The operator judges that the lower end of the coupling socket 27 is positioned at the upper end of the hollow piston 16 when the operation signal of the hook limit switch is displayed on the display apparatus 66.

The operator judges the positioning of the lower end portion of the coupling socket 27 at the upper end portion of the hollow piston 16 based on the measured value of the load gauge and existence of the operation signal of the hook limit switch, so that the reliability of the judgment result is improved.

When the lower end portion of the coupling socket 27 is positioned at the upper end portion of the hollow piston 16, the wind button is pressed by the operator and under the control of the control apparatus 67, the supplementary hoist 59 is driven and the wire rope 58 is wound. The handling apparatus body 40 rises and the hook 49 makes contact with the handle 36 of the new control rod 11. At this time, the hook limit switch is away from the lower end face of the grasping equipment 48 and no operation signal is output from the hook limit switch. The information indicating that no operation signal is output from the hook limit switch is displayed on the display apparatus 66. At the sight of it, the operator presses the hoist stop button, so that the supplementary hoist 59 is stopped and the rise of the handling apparatus body 40 is stopped. The hook 49 is held in the state that it is in contact with the handle 36 of the new control rod 11 (refer to (b) shown in FIG. 9). Even in this state, the lower end portion of the coupling socket 27 is positioned at the upper end portion of the hollow piston 16, that is, at the upper end of the coupling spud convexity 31 and the load of the new control rod 11 is supported by the hollow piston 16.

When the hook 49 makes contact with the handle 36 of the new control rod 11, thus the operation signal from the hook limit switch is displayed on the display apparatus 66, the motor drive button is pressed by the operator. Under the control of the control apparatus 67, the motor 44 is driven, and the rotary shaft 46 rotates, and the grasping equipment 48 is rotated at 90°. In the state that the load of the new control rod 11 is applied to the hollow piston 16, the new control rod 11 is also rotated by the hook 49 (refer to (c) shown in FIG. 9).

Figure 9:
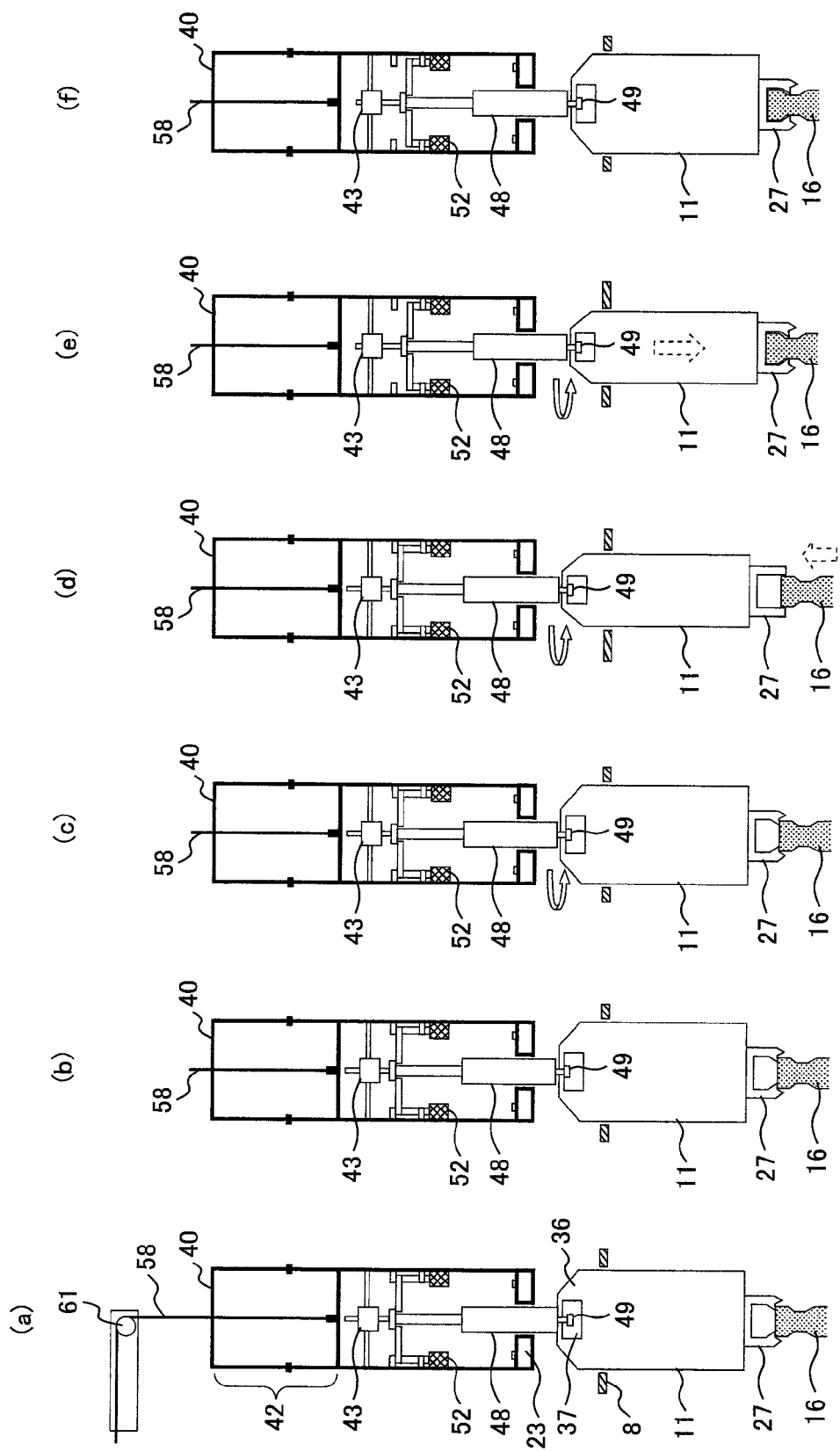
FIG. 9 is an explanatory drawing showing processes for connecting a control rod and control rod drive mechanism in a method of handling a control rod of embodiment 1.

During the rotation of the new control rod 11, each of the gaps 38 formed between the joint convexities 29 in the coupling socket 27 installed on the new control rod 11 is positioned right above each of the coupling spud convexities 31 of the hollow piston 16 (refer to (d) shown in FIG. 9). This state is generated when the new control rod 11 rotates at 45°. When each of the gaps 38 is positioned right above each of the coupling spud convexities 31, the hollow piston 16 is pushed up by the force of a spring (not shown) installed in the CRD 15 (refer to the upward-directed arrow shown in (d) in FIG. 9).

When each of the gaps 38 is positioned right above each of the coupling spud convexities 31, the new control rod 11 can fall by its own weight together with the grasping equipment 48 and in the state that the motor 44 rotates, each of the coupling spud convexities 31 passes through each of the gaps 38 and the lower end of each of the coupling spud convexities 31 soon reaches above the upper end of each of the joint convexities 29 (refer to (b) and (e) shown in FIG. 5). The falling speed of the new control rod 11 by its own weight is relieved by the grasping equipment movement apparatus 52. When each of the gaps 38 is positioned right above each of the coupling spud convexities 31, compressed air existing below the piston in each of the cylinders of the cylinder apparatuses 53A and 53B is discharged from the discharge port formed at the lower end of each cylinder because the piston is pushed down by its own weight of the new control rod 11. A discharge tube with a valve installed is connected to the discharge port and when the piston is pushed down, the valve is open. By the discharge of the compressed air from the cylinders, the lowering speed of the pistons is decreased so as to relieve the shock load applied to the hollow piston 16 caused by the falling new control rod 11. In correspondence to the descent of the pistons, the operation plate 57 also moves down. Therefore, the grasping equipment 48, hook 49, and new control rod 11 move down gradually, and each of the coupling spud convexities 31 is inserted into each of the gaps 38, thus the aforementioned states shown in (b) and (e) in FIG. 5 appear. The states are the same as the state shown in (e) in FIG. 9. In the state shown in (e) in FIG. 9, the position of the upper end of the hollow piston 16 is higher than the position in the state shown in (d) in FIG. 9. In the state shown in (e) in FIG. 9, the position of the upper end of the hollow piston 16 is a position of the upper end of the hollow piston 16 which is decided when the aforementioned push-up force by the spring of the hollow piston 16, its own weight of the falling control rod 11, and the relief operation of the lowering speed by the grasping equipment movement apparatus 52 are balanced.

When the grasping equipment 48 rotates at 90° from the state shown in (a) in FIG. 9, each of the coupling spud convexities 31 reaches right above each of the joint convexities 29 (refer to (a) and (d) in FIG. 5). As mentioned above, when the grasping equipment 48 rotates at 90°, the control apparatus 67 turns on the switch 68, so that the motor 44 is stopped and the rotation of the new control rod 11 is stopped. The new control rod 11 is connected to the hollow piston 16 of the CRD 15 (refer to (e) shown in FIG. 9).

Even if the grasping equipment 48 rotates at 90° from the state shown in (a) in FIG. 9, after the drive of the motor 44 is stopped, when in the respective cylinders of the cylinder apparatuses 53A and 53B, each piston is pushed down and the operation plate 57 makes contact with the limit switches 55A and 55B, the operation signals are output from the limit switches 55A and 55B. These operation signals are displayed on the display apparatus 66. The operator looks at the displayed operation signals, and thereby presses the valve close button. At this time, the control apparatus 67 outputs a valve close control signal and the valve installed on the discharge tube connected to the discharge port formed at the lower end of the cylinder is closed completely. The descent of each piston in the respective cylinders of the cylinder apparatuses 53A and 53B is stopped and the descent of the grasping equipment 48 supported by the operation plate 57 is stopped (refer to (f) shown on FIG. 9). In this state, the coupling spuds 30 and coupling spud convexities 31 of the hollow piston 16 are inserted completely into the coupling socket 27.

In (e) shown in FIG. 9, before the grasping equipment 48 rotates at 90° from the state shown in (a) in FIG. 9, when the operation plate 57 makes contact with the limit switches 55A and 55B, at this point in time, the descent of the grasping equipment 48 is stopped.

From the aforementioned, all the processes of connecting the control rod 11 to the CRD 15 are finished. Thereafter, the fuel support handling portion installed in the handling apparatus body 40 moves down and the fuel support 23 held by the fuel support grasping equipment is mounted on the corresponding control rod guide tube 12. The fuel support 23 is removed from the fuel support grasping equipment. And, the hook 49 is rotated and is removed from the handle 36 of the new control rod 11. The operator presses the hook opening button installed on the operation panel. By a hook opening command output by the button operation, the control apparatus 67 outputs a hook opening control signal to the hook drive apparatus installed in the grasping equipment 48 via a cable (not shown). The hook drive apparatus operates to rotate the hook 49, thus the joint state of the hook 49 to the handle 36 is released.

Thereafter, the wind button is pressed by the operator and the wire rope 58 is wound around the supplementary hoist 59. The handling apparatus body 40 rises in the core 4, reaches the inside of the reactor well 73 from the inside of the reactor pressure vessel 3, and is taken out above the liquid surface of the cooling water 74. The handling apparatus body 40 is removed from the wire rope 58.

The fuel exchange apparatus 69 is moved up to the fuel storage pool. After the blade guide is inserted into the core 4, by the operation of the CRD 15, the new control rod 11 is fully inserted into the core 4. Each of the fuel assemblies 5 taken out from the core 4 to exchange the control rod is sequentially transferred into the core 4 by the fuel exchange apparatus 69. Each lower tie-plate 6 of the fuel assemblies 5 is inserted into the opening 24 of the fuel support 23 into which the upper end of the new control rod 11 is inserted.

At the process aforementioned, the residual control rods 11 to be exchanged existing in the reactor pressure vessel 3 are sequentially exchanged with new control rods 11. After the exchange of all the control rods 11 to be exchanged with new control rods 11 is finished and the periodic inspection of the nuclear reactor 2 is finished, the separator 18, shroud head 33, and dryer 19 are sequentially transferred and installed in the reactor pressure vessel 3. An upper cover is attached to the reactor pressure vessel 3.

In the present embodiment, when connecting the control rod 11 to the CRD 15, in the state that the lower end portion of the coupling socket 27 is positioned at the upper end portion of the hollow piston 16, the control rod 11 is rotated, so that when each of the gaps 38 is positioned right above each of the coupling spud convexities 31, the control rod 11 falls by its own weight and each of the coupling spud convexities 31 is inserted into each of the gaps 38. Therefore, each of the coupling spud convexities 31 can be inserted surely into the hole portion 28 formed in the coupling socket 27. The control rod 11 and CRD 15 can be connected to each other in a short period of time using the bayonet coupling 26.

In the present embodiment that the control rod 11 is permitted to fall down by its own weight and each of the coupling spud convexities 31 is inserted into each of the gaps 38, the control rod 11 and CRD 15 can be connected to each other in a shorter period of time than the method for connecting the control rod to the CRD described in Japanese Patent 3119728. Further, in the connection method of the control rod to the CRD in the present embodiment using the free falling of the control rod, the coupling spud convexities 31 can be more surely into the coupling socket 27 rather than the connection method of the control rod and CRD described in Japanese Patent 3119728.

At the time of connection of the control rod 11 to the CRD 15, the falling speeds of the control rod 11 and grasping equipment 48 falling by their own weight are decreased by using the grasping equipment movement apparatus 52 installed in the handling apparatus body 40, concretely, the cylinder apparatuses 53A and 53B and operation plate 57. Therefore, the shock load applied to the hollow piston 16 of the CRD 15 by the falling of the control rod 11 and grasping equipment 48 by their own weight can be relieved. As a result, the coupling socket 27 of the control rod 11 and the coupling spud 30 installed in the hollow piston 16 of the CRD 15 can be prevented from being damage.

In the present embodiment, the limit switches 55A and 55B for restricting the lower limit of the movement range of the casing 41 in the axial direction and the limit switches 56A and 56B for restricting the upper limit of the movement range are installed in the casing 41. Therefore, when connecting the control rod 11 to the CRD 15, the operator can find that the control rod 11 falls normally and each of the coupling spud convexities 31 is inserted completely into the hole portion 28 formed in the coupling socket 27 by the operation of the limit switches 55A and 55B by the operation plate 57. When releasing the connection of the control rod 11 to the CRD 15, the control rod 11 and grasping equipment 48 are prevented from being excessively lifted up by the grasping equipment movement apparatus 52. Concretely, the operation plate 57 makes contact with the limit switches 56A and 56B, thus the rise of the operation plate 57 by the cylinder apparatuses 53A and 53B is stopped.

In the present embodiment, when releasing the connection of the control rod 11 to the CRD 15, the control rod 11 is lifted up by the grasping equipment movement apparatus 52, so that the hollow piston 16 connected to the control rod 11 by the bayonet coupling 26 is also lifted up. In this state, the control rod 11 is rotated, so that when each of the gaps 38 is positioned right under each of the coupling spud convexities 31, the hollow piston 16 falls by its own weight and each of the coupling spud convexities 31 is inserted into each of the gaps 38. Therefore, using its own weight of the hollow piston 16, the coupling spud convexities 31 can be separated easily from the coupling socket 27. Accordingly, the connection of the control rod 11 to the CRD 15 can be released easily.

In the present embodiment, the control rod 11 and hollow piston 16 are lifted up using the cylinder apparatuses 53A and 53B. Therefore, due to excessive lifting of the hollow piston 16, the operation of the latch to prevent falling of the hollow piston 16 that is installed in the CRD 15 can be prevented. In other words, the hollow piston 16 can be lifted up within the range that the latch does not operate by use of the cylinder apparatuses 53A and 53B.

In the present embodiment, an air cylinder is used for the cylinder apparatuses 53A and 53B, however, an oilostatic cylinder or a hydraulic cylinder may be used.

Figure 10:
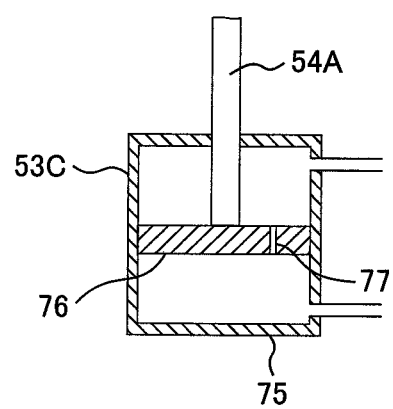
FIG. 10 is a structural diagram showing another embodiment of a cylinder apparatus shown in FIG. 7.

As the cylinder apparatuses 53A and 53B, the cylinder apparatus 53C shown in FIG. 10 may be used. The cylinder apparatus 53C has a structure that in the cylinder apparatuses 53A and 53B, the piston is replaced with a piston 76. The other constitution of the cylinder apparatus 53C is the same as that of the cylinder apparatuses 53A and 53B. In the cylinder apparatus 53C, in the piston 76 arranged in a cylinder 75, a through hole 77 having a small diameter is formed. By the formation of the through hole, the piston 76 is structured so as to have an orifice. The piston rod 54A passing through the cylinder 75 is connected to the piston 76. The piston 76 has an orifice (the through hole 77), so that when the control rod 11 falls by its own weight when the control rod 11 and CRD 15 are connected, the falling speed of the control rod 11 can be decreased.

Embodiment 2

A method of handling a control rod of embodiment 2 that is another embodiment of the present invention is explained below. The control rod handling apparatus 39A used in the present embodiment, as shown in FIG. 11, has a constitution that in the control rod handling apparatus 39, the cable 64 is connected to the control apparatus 67. The load gauge installed in the grasping equipment 48 and the hook limit switch installed in the hook 49 are connected to the control apparatus 67 with a cable. The other constitution of the control rod handling apparatus 39A is the same as that of the control rod handling apparatus 39.

In the method of handling the control rod of the present embodiment, at the respective processes of the connection release of the control rod 11 and CRD 15 in the control rod exchange and the connection of the control rod 11 and CRD 15, the output of each control signal executed by the control apparatus 67 by the operation of each button by the operator which is executed in embodiment 1 is automated by the control apparatus 67. Therefore, the operations of the control rod handling apparatus 39A at the respective processes of the connection release of the control rod 11 and CRD 15 in the control rod exchange and the connection of the control rod 11 and CRD 15 are executed automatically by the control apparatus 67.

The present embodiment can obtain the effects produced in Embodiment 1. In the present embodiment, the operations of the control rod handling apparatus 39A at the respective processes of the connection release of the control rod 11 and CRD 15 in the control rod exchange and the connection of the control rod 11 and CRD 15 are executed automatically by the control apparatus 67, so that the burden imposed on the operator is lightened.

The process of connecting the control rod 11 to the CRD 15 using the bayonet coupling (refer to FIG. 9) in embodiments 1 and 2, in a BWR plant newly built, can be applied to the connection of the control rod 11 to the CRD 15.

INDUSTRIAL APPLICABILITY

The present invention is applied to the boiling water nuclear power generation plant.

REFERENCE SIGNS LIST

1: boiling water nuclear plant, 3: reactor pressure vessel, 4: core, 5: fuel assembly, 7: core shroud, 8: core support plate, 10: upper grid plate, 11: control rod, 12: upper grid plate guide tube, 15: control rod drive mechanism, 16: hollow piston, 23: fuel support, 26: bayonet coupling, 27: coupling socket, 28: hole portion, 29: joint convexity, 30: coupling spud, 31: coupling spud convexity, 36: handle, 39, 39A: control rod handling apparatus, 40: handling apparatus body, 41: casing, 43: grasping equipment rotation apparatus, 44: motor, 48: grasping equipment, 49: hook, 52: grasping equipment movement apparatus, 53A, 53B, 53C: cylinder apparatus, 55A, 55B, 56A, 56B: limit switch, 59: supplementary hoist, 66: display apparatus, 67: control apparatus.

What is claimed is:

1. A method of handling a control rod for connecting a plurality of coupling spuds that are included in a hollow piston of a control rod drive mechanism installed in a reactor pressure vessel, the coupling spuds having a plurality of first projection projected outward at an upper end portion and being arranged around an upper end portion of the hollow piston to a coupling socket installed at a lower end portion of the control rod, the coupling socket forming a hole portion with one end opened and having a plurality of second projections formed on an inner surface of the hole portion and projected inward, by using a control rod handling a apparatus having a casing, cylinder apparatus attached to the casing, the cylinder apparatus including a cylinder, a piston disposed in the cylinder and a piston rod connected to the piston, a control rod grasping apparatus supported by the piston rod, and a grasping equipment rotation apparatus, comprising steps of:

moving down the control rod held by the control rod grasping apparatus into said reactor pressure vessel together with the control rod grasping apparatus in a state in which the control rod grasping apparatus is supported by the piston rod, and then, positioning the coupling socket at the upper end portion of the hollow piston existing in the reactor pressure vessel;

thereafter, rotating the control rod by the grasping equipment rotation apparatus;

moving down the control rod and the control rod grasping apparatus by their own weights when each gap formed between the second projections adjoining each other in a peripheral direction of the hole portion is positioned right above each of the first projections by rotation of the control rod, and thus, permitting each of the first projections to pass through each of the gaps; and rotating the control rod in a state that the first projection is positioned above the second projections, positioning the first projection right above the second projections by this rotation of the control rod, and thus, connecting said plurality of coupling spuds to said coupling socket, wherein the descent of the control rod and the control rod grasping apparatus by the own weights is executed by decreasing lowering speeds of the control rod and the control rod grasping apparatus by descent of the piston of the cylinder apparatus for holding the control rod grasping apparatus.

2. The method of handling a control rod according to claim 1, wherein the rotation of the control rod is executed by rotating the control rod grasping apparatus.

* * * * *